United States Patent
Sanpei et al.

(10) Patent No.: US 6,204,328 B1
(45) Date of Patent: Mar. 20, 2001

(54) POLYOLEFIN RESIN COMPOSITION

(75) Inventors: Akihiko Sanpei, Chiba; Yozo Shimomura, Ichihara, both of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/424,298

(22) PCT Filed: May 20, 1998

(86) PCT No.: PCT/JP98/02213

§ 371 Date: Nov. 22, 1999

§ 102(e) Date: Nov. 22, 1999

(87) PCT Pub. No.: WO98/54257

PCT Pub. Date: Mar. 12, 1998

(30) Foreign Application Priority Data

May 26, 1997 (JP) .................................................. 9-135262

(51) Int. Cl.$^7$ ............................................. C08L 53/00
(52) U.S. Cl. ....................................................... 525/89
(58) Field of Search ................................................ 525/89

(56) References Cited

U.S. PATENT DOCUMENTS

| | | |
|---|---|---|
| 4,226,952 | 10/1980 | Halasa et al. . |
| 4,237,245 | 12/1980 | Halasa et al. . |
| 4,780,443 | 10/1988 | Matsuura et al. . |
| 5,177,162 | 1/1993 | Matsuura et al. . |
| 5,260,366 * | 11/1993 | Mitsuno ................. 524/426 |
| 5,532,325 | 7/1996 | Oka et al. . |
| 5,543,454 * | 8/1996 | Kamakura ............. 524/451 |

FOREIGN PATENT DOCUMENTS

| | | |
|---|---|---|
| 59-37294 | 9/1984 | (JP) . |
| 62-187707 | 8/1987 | (JP) . |
| 62-45883 | 9/1987 | (JP) . |
| 1-168743 | 7/1989 | (JP) . |
| 1-168744 | 7/1989 | (JP) . |
| 1-254706 | 10/1989 | (JP) . |
| 4-342752 | 11/1992 | (JP) . |
| 5-132606 | 5/1993 | (JP) . |
| 6-306121 | 11/1994 | (JP) . |
| 7-53828 | 2/1995 | (JP) . |
| 9-77953 | 3/1997 | (JP) . |
| 9-77954 | 3/1997 | (JP) . |
| 93/08221 | 4/1993 | (WO) . |

\* cited by examiner

Primary Examiner—Paul R. Michl
(74) Attorney, Agent, or Firm—McDermott, Will & Emery

(57) ABSTRACT

A polyolefin resin composition comprising (a) 50–94% by weight of a specific polypropylene/ethylene-propylene copolymer composition, (b) 5–40% by weight of a specific ethylene/α-olefin copolymer rubber and (c) 1–10% by weight of a specific hydrogenated diene block copolymer, wherein the component (a) comprises 60–95% by weight of a polypropylene component and 5–40% by weight of an ethylene-propylene copolymer component having an ethylene content of 30–80% by weight, the polypropylene component has an isotactic pentad ratio (P) of not less than 0.96 and a $M_w/M_n$ (Q value) of not more than 6, and a ratio of the maximum melt flow rate ($MFR_{max}$) to the minimum melt flow rate ($MFR_{min}$) has the following relationship $$0.1 \leq \mathrm{Log}(MFR_{max}/MFR_{min}) \leq 1$$

and further the melt flow rate of the polypropylene component ($MFR_{PP}$) and the melt flow rate of the ethylene-propylene copolymer component ($MFR_{EP}$) have the following relationship $$3 \leq \mathrm{Log}(MFR_{PP}/MFR_{EP}) \leq 7$$

and the component (b) has an ethylene content of 25–90% by weight and contains a polyethylene crystal having a long period of 6–14 nm as determined by a small angle X-ray scattering. The polyolefin resin composition can further comprise 5–30% by weight of talc.

10 Claims, No Drawings

POLYOLEFIN RESIN COMPOSITION

TECHNICAL FIELD OF THE INVENTION

This invention relates to polyolefin resin compositions, and more particularly, to the resin compositions having a good flowability and high-temperature rigidity, and a well-balanced combination of the properties such as rigidity and impact resistance, which are suitable for the manufacture of molded articles, especially interior automotive trim parts.

BACKGROUND ART

Polypropylene resins have been extensively used in automotive applications and in various fields such as electrical appliances, miscellaneous goods or films, because the articles molded therefrom are excellent in rigidity and high-temperature rigidity. However, conventional polypropylene resins have been limited in the use range, since the articles molded therefrom are deficient in impact resistance.

As typical polypropylene resins having improved impact resistance are known a polypropylene resin comprising propylene/ethylene block copolymers wherein propylene and ethylene are block copolymerized, and polypropylene resin compositions wherein polypropylene is incorporated with an ethylene/α-olefin copolymer rubber. Since such polypropylene resins have lower rigidity than a propylene homopolymer, these resins are incorporated with inorganic fillers such as talc to make up for lowered rigidity, as the occasion demands, and used mainly as molding materials for exterior automotive trim parts including automotive bumpers and interior automotive trim parts including instrument panels, console boxes, resin pillars and trims. However, inorganic fillers should be incorporated in a large amount so as to enhance the rigidity of the resin composition, which leads to a lowered flowability of the resultant composition and an increased specific gravity of the resultant molded article, resulting in an increased weight of the products.

With a view to improving the impact resistance and stress-whitening resistance of α-olefin polymers such as polypropylene and polyethylene, the resin compositions wherein hydrogenated diene copolymers are incorporated therein have been proposed.

For example, JP-B-59-37294 discloses a resin compositions wherein a hydrogenated 1,2-polybutadiene is incorporated in polymers or copolymers of α-olefin with 2 to 20 carbons, especially ethylene homopolymer, propylene homopolymer or propylene/ethylene copolymer.

JP-B-62-45883 and JP-A-4-342752 disclose a resin composition wherein a hydrogenated diblock copolymer of polybutadienes consisting of 1,2-block and 1,4-block is incorporated in α-olefin polymers or copolymers, in particular polypropylene.

JP-A-5-132606 discloses a resin composition wherein a hydrogenated product of polybutadiene/conjugated diene block copolymers is incorporated in a crystalline propylene/ethylene block copolymer. JP-A-1-168743 and JP-A-1-168744 disclose a resin composition wherein a hydrogenated product of isoprene/butadiene copolymers is incorporated in polyolefins. These resin compositions are improved in both stress-whitening resistance and impact resistance, but remarkably lowered in rigidity and high-temperature rigidity. Thus a practical use of such resin compositions is limited to the field of soft materials.

In order to enhance the reduced rigidity and high-temperature rigidity in the above-described resin compositions wherein the hydrogenated diene block copolymers are incorporated in the propylene/ethylene block copolymers, it is considered that high stereoregular polypropylenes disclosed in JP-A-1-254706 and JP-A-62-187707 may be used instead of said propylene/ethylene block copolymers, whereby the rigidity and the high-temperature rigidity of the molded articles are improved without any increase in the specific gravity. However, a reduction in impact resistance of the molded articles is also anticipated.

As mentioned above, the impact resistance of the polypropylene resin compositions is improved by the incorporation of the ethylene/α-olefin copolymer rubber or the hydrogenated polybutadiene polymer or copolymer. However, the incorporation of these rubber components in a large amount brings about another problem of lowering the rigidity, the high-temperature rigidity and the flowability of the resulting molded articles. Thus, it has been desired to develop a polypropylene resin composition capable of improving the impact resistance of the molded articles without reducing the rigidity and the high-temperature rigidity of the molded articles as well as the flowability of the resin compositions.

Accordingly, an object of the present invention is to provide a polyolefin resin composition having good flowability of the resin composition, good rigidity, high-temperature rigidity and impact resistance of the molded article as well as a well-balanced combination of these properties.

SUMMARY OF THE INVENTION

The above-mentioned object of the invention can be attained by incorporation of a specific hydrogenated diene block copolymer into a composition comprising a specific high rigid polypropylene/ethylene-propylene copolymer composition and a specific ethylene/α-olefin copolymer rubber.

The present invention provides a polyolefin resin composition comprising (a) 50–94% by weight of a polypropylene/ethylene-propylene copolymer composition, (b) 5–40% by weight of an ethylene/α-olefin copolymer rubber and (c) 1–10% by weight of a hydrogenated diene block copolymer, the sum of components (a), (b) and (c) being 100% by weight, wherein the polypropylene/ethylene-propylene copolymer composition (a) comprises 60–95% by weight of a polypropylene component and 5–40% by weight of an ethylene-propylene copolymer component having an ethylene content of 30–80% by weight, the polypropylene component has an isotactic pentad ratio (P) of not less than 0.96 and a $M_w/M_n$ (Q value) of not more than 6, and a ratio of the maximum melt flow rate ($MFR_{max}$) to the minimum melt flow rate ($MFR_{min}$) has the following relationship $$0.1 \leq Log(MFR_{max}/MFR_{min}) \leq 1$$

and further the polypropylene/ethylene-propylene copolymer composition (a) has the following relationship between the melt flow rate of the polypropylene component ($MFR_{PP}$) and the melt flow rate of the ethylene-propylene copolymer component ($MFR_{EP}$)

$$3 \leq Log(MFR_{PP}/MFR_{EP}) \leq 7$$

the ethylene/α-olefin copolymer rubber (b) is a copolymer of ethylene and an α-olefin of 4 or more carbons, has an ethylene content of 25–90% by weight and contains a polyethylene crystal having a long period of 6–14 nm as determined by a small angle X-ray scattering, and the hydrogenated diene block copolymer (c) is A-B or A-B-A block copolymer wherein A segment is a 1,4-polybutadiene block and B segment is a 1,2-polybutadiene block, a polyisoprene block or a butadiene/isoprene copolymer block, not less than 85% of unsaturated bonds therein being hydrogenated.

The present invention also provides a polyolefin resin composition comprising 70–95% by weight of the above polyolefin resin composition and (d) 5–30% by weight of talc.

The present invention further provides an interior automotive trim part which is molded from the above polyolefin resin composition having a melt flow rate of not less than 20 g/10 min and has a flexural modulus of not less than 2200 MPa at 23° C., a heat distortion temperature of not lower than 70° C. and an Izod impact strength of not less than 300 J/m at room temperature.

MODE FOR CARRYING OUT THE INVENTION

The polyolefin resin composition of the invention comprises:

(a) 50–94% by weight of a polypropylene/ethylene-propylene copolymer composition, (b) 5–40% by weight of an ethylene/α-olefin copolymer rubber, and (c) 1–10% by weight of a hydrogenated diene block copolymer.

The present invention also includes a polyolefin resin composition wherein (d) 5–30% by weight of talc, based on the total weight of the composition, and (e) a desired additive are further incorporated in the above-mentioned polyolefin resin composition.

Each component constituting the polyolefin resin composition of the present invention is fully described below.

(a) Polypropylene/ethylene-propylene copolymer composition

The polypropylene/ethylene-propylene copolymer composition (a) is a main component in the present resin composition and comprises the polypropylene component having a high melt flow rate, a high stereoregularity and a narrow molecular weight distribution and the ethylene-propylene copolymer component having an ethylene content of 30–80% by weight.

The polypropylene component has a high stereoregularity with an isotactic pentad ratio (P) of not less than 0.96, and has a narrow molecular weight distribution with a ratio of weight average molecular weight ($M_w$) to number average molecular weight ($M_n$) (Q value) of not more than 6, said molecular weight being determined by gel permeation chromatography (GPC), and further has a ratio of the maximum melt flow rate ($MFR_{max}$) to the minimum melt flow rate ($MFR_{min}$) with the following relationship $$0.1 \leq Log(MFR_{max}/MFR_{min}) \leq 1$$

and preferably $$0.2 \leq Log(MFR_{max}/MFR_{min}) \leq 0.5$$

said melt flow rate being determined at 230° C. under a load of 2.16 kg according to ASTM D 1238.

The isotactic pentad ratio (P) is closely related with the rigidity of the molded article. Higher ratio (P) provides more improved rigidity. Lower Q value provides narrower molecular weight distribution and more improved impact resistance of the molded article. The ratio of $MFR_{max}$ to $MFR_{min}$ has an effect on the mechanical properties of the molded article. If the ratio of $MFR_{max}$ to $MFR_{min}$ is too low, the rigidity lowers. If it is too high, the tensile elongation and the impact resistance lower.

The ethylene-propylene copolymer component is a random copolymer of ethylene and propylene with an ethylene content of 30–80% by weight, preferably 40–70% by weight. The ethylene content has an effect on the rigidity and impact resistance of the molded article. If it is too high, the rigidity lowers. If it is too low, the impact resistance lowers.

The ethylene-propylene copolymer component can employ a copolymer wherein a part of propylene copolymerized with ethylene is replaced by other olefin or non-conjugated diene within such a range as not to adversely affect various properties of the final polyolefin resin composition.

The polypropylene/ethylene-propylene copolymer composition (a) has the following relationship between the melt flow rate of the polypropylene component ($MFR_{PP}$) and the melt flow rate of the ethylene-propylene copolymer component ($MFR_{EP}$)

$$3 \leq Log(MFR_{PP}/MFR_{EP}) \leq 7$$

and preferably $$4 \leq Log(MFR_{PP}/MFR_{EP}) \leq 6.$$

The ratio of $MFR_{PP}$ to $MFR_{EP}$ has an effect on the impact resistance and tensile elongation of the molded article.

Where the polypropylene/ethylene-propylene copolymer composition (a) is produced by a two-stage polymerization process comprising the homopolymerization of propylene and the subsequent copolymerization of ethylene and propylene, $MFR_{EP}$ cannot be determined directly. Therefore, it can be calculated from $MFR_{PP}$ of the propylene homopolymer and the melt flow rate of the composition (a) ($MFR_a$) which can be determined directly, as well as the weight fraction of the propylene homopolymer ($W_{PP}$) and the weight fraction of the ethylene-propylene copolymer ($W_{EP}$) in the composition (a) according to the following equations.

$$W_{EP} \cdot Log\ MFR_{EP} = Log\ MFR_a - W_{PP} \cdot Log\ MFR_{PP}$$

$$W_{EP} + W_{PP} = 1$$

The polypropylene/ethylene-propylene copolymer composition (a) is adjusted to provide the melt flow rate ($MFR_a$)

in the range of 0.1–100 g/10 min, preferably 1–80 g/10 min. If $MFR_a$ is too low, the flowability is unsatisfactory and the moldability lowers. If it is too high, the impact resistance of the molded article lowers.

The composition ratio of the polypropylene component to the ethylene-propylene copolymer component varies depending on $MFR_{PP}$ of the polypropylene component and the ethylene content and $MFR_{EP}$ of the ethylene-propylene copolymer component, but the polypropylene component is approximately 60–95% by weight and the ethylene-propylene copolymer component is approximately 40–5% by weight.

In the polyolefin resin composition of the present invention, the amount of the polypropylene/ethylene-propylene copolymer composition (a) incorporated is 50–94% by weight on the basis of the total weight of the resin composition comprising the components (a), (b) and (c).

The polypropylene/ethylene-propylene copolymer composition (a) is a component for imparting the rigidity and the high-temperature rigidity to the molded article. If the amount of the component incorporated is too little, the rigidity and the high-temperature rigidity of the molded article lower. If it is too much, the impact resistance of the molded article lowers.

The polypropylene/ethylene-propylene copolymer composition (a) may be prepared by any method if satisfying the above-mentioned requirements. It can be readily produced by a two-stage polymerization process of homopolymerizing propylene in the polymerization step (I) to produce a polypropylene component having the above-mentioned characteristics and subsequently copolymerizing ethylene and propylene in the polymerization step (II) in the presence of the propylene homopolymer produced in the polymerization step (I) to produce an ethylene-propylene copolymer component.

More specifically, homopolymerization of propylene is performed in the polymerization step (I) using two or more polymerization vessels in series and using a catalyst system for the polymerization of high stereoregular polyolefin polymer, e.g., a catalyst system which comprises a combination of a solid catalyst component requiring titanium, magnesium, halogen and polycarboxylic acid ester, an organoaluminum compound and an organosilicon compound, thus producing a polypropylene component having the above-mentioned characteristics which corresponds to 60–95% by weight of the composition (a). In the subsequent polymerization step (II) using one or more polymerization vessels, ethylene and propylene are copolymerized in the presence of the resulting polypropylene component to produce an ethylene-propylene copolymer component with the ethylene content of 30–80% by weight, which corresponds to the rest of the composition (a), by which the polypropylene/ethylene-propylene copolymer composition (a) can be prepared.

Preferable titanium compounds which can be used for the solid catalyst component are the compounds represented by the formula $Ti(OR)_nX_{4-n}$ wherein R is a hydrocarbon group, X is halogen and $0 \leq n \leq 4$, for example, tetrahalogenated titanium such as $TiCl_4$ and $TiBr_4$; trihalogenated alkoxy titanium such as $Ti(OCH_3)Cl_3$ and $Ti(OC_2H_5)Cl_3$; dihalogenated dialkoxy titanium such as $Ti(OCH_3)_2Cl_2$ and $Ti(OC_2H_5)_2Cl_2$; monohalogenated trialkoxy titanium such as $Ti(OCH_3)_3Cl$ and $Ti(OC_2H_5)_3Cl$; and tetralkoxy titanium such as $Ti(OCH_3)_4$ and $Ti(OC_2H_5)_4$. In particular, $TiCl_4$ is preferably used.

Magnesium compounds used therefor are magnesium compounds with or without a reducing ability. Examples of magnesium compounds with a reducing ability can include dimethyl magnesium, diethyl magnesium, dipropyl magnesium, dibutyl magnesium, ethyl magnesium chloride, propyl magnesium chloride, butyl magnesium chloride, and the like. Examples of magnesium compounds without a reducing ability can include magnesium halides such as magnesium chloride, magnesium bromide and magnesium iodide; alkoxy magnesium chlorides such as methoxy magnesium chloride and ethoxy magnesium chloride; alkoxy magnesium such as ethoxy magnesium, isopropoxy magnesium and butoxy magnesium; magnesium carboxylates such as magnesium laurate and magnesium stearate, and the like. Especially, magnesium halides, alkoxy magnesium chlorides and alkoxy magnesium are preferably used.

Preferable polycarboxylic acid esters are alcohol esters of polycarboxylic acid such as phthalic acid, maleic acid and substituted malonic acid, having two or more carbons.

In the preparation of the solid catalyst component using each of the above-mentioned components, an electron donor such as alcohols, ethers, phenols, silicon and aluminum compounds can be used together with the above components, if desired.

The solid catalyst component using each of the above-mentioned components can be prepared by known methods using each peculiar component.

The organoaluminum compounds used in combination with the solid catalyst component are the compounds of the formula $AlR^1_lR^2_mX_{3-(l+m)}$ wherein $R^1$ and $R^2$ may be the same or different and each represent a hydrocarbon group or an alkoxy group, X is halogen, $0 \leq l \leq 3$, $0 \leq m \leq 3$ and $1.5 \leq l+m \leq 3$.

For example, the organoaluminum compounds include trimethylaluminum, triethylaluminum, tri-n-propylaluminum, tri-n-butylaluminum, tri-i-butylaluminum, diethylaluminum chloride, di-n-propylaluminum chloride, diethylaluminum iodide, methylaluminum sesquichloride, ethylaluminum sesquichloride and ethoxy diethylaluminum, which may be used either alone or in combination.

The organosilicon compounds used in combination with the above solid catalyst component and the organoaluminum compounds are the organosilicon compounds of the formula $R^3_xR^4_ySi(OR^5)_z$ wherein $R^3$ and $R^4$ represent different hydrocarbon groups, $R^5$ represents a hydrocarbon group which may contain a heteroatom, $x+y+z=4$, $0 \leq x \leq 2$, $1 \leq y \leq 3$ and $1 \leq z \leq 3$.

For example, the organosilicon compounds can include methyltrimethoxysilane, methyltriethoxysilane, methyltripropoxysilane, ethyltrimethoxysilane, ethyltriethoxysilane, ethyltripropoxysilane, n-propyltrimethoxysilane, n-propyltriethoxysilane, i-propyltrimethoxysilane, i-propyltriethoxysilane, n-butyltrimethoxysilane, n-butyltriethoxysilane, i-butyltrimethoxysilane, i-butyltriethoxysilane, t-butyltrimethoxysilane, t-butyltriethoxysilane, n-pentyltrimethoxysilane, n-pentyltriethoxysilane, neopentyltrimethoxysilane, neopentyltriethoxysilane, hexadecyltrimethoxysilane, hexadecyltriethoxysilane, dimethyldimethoxysilane, dimethyldiethoxysilane, diethyldimethoxysilane, diethyldiethoxysilane, di-n-propyldimethoxysilane, di-i-propyldimethoxysilane, di-n-butyldimethoxysilane, di-i-butyldimethoxysilane, di-t-butyldimethoxysilane, di-n-pentyldimethoxysilane, dineopentyldimethoxysilane, phenyltrimethoxysilane, phenyltriethoxysilane, diphenyldimethoxysilane, diphenyldiethoxysilane, cyclohexyltrimethoxysilane, cyclohexyltriethoxysilane, dicyclohexyldimethoxysilane, dicyclohexyldiethoxysilane, 3-mercaptopropylmethyldimethoxysilane, 3-isocyanatopropyltriethoxysilane and 2-(3-cyclohexenyl) ethylmethoxysilane. Especially, di-i-propyldimethoxysilane, t-butyltrimethoxysilane, t-butyltriethoxysilane, i-butyltrimethoxysilane and cyclohexyltrimethoxysilane are preferably used.

These organosilicon compounds can be used either alone or in admixture of two or more in any proportion.

Prior to the homopolymerization of propylene in the polymerization step (I), a catalyst system comprising 0.3–20 mols of the organoaluminum compounds per 1 mol of titanium in the solid catalyst component is preferably reacted with 0.1–10 mols, preferably 0.3–3 mols of α-olefin per 1 mol of titanium at a temperature of 0–50° C. for 1 minute to 20 hours, to preactivate the catalyst system.

The α-olefins which can be used for the preactivation are ethylene, butene-1, hexene-1, heptene-1, and other straight-chain mono-olefins, branched-chain mono-olefins such as 4-methyl-pentene-1, 2-methyl-pentene-1, 3-methyl-butene-1, etc., styrene, and the mixture of these with propylene.

The preactivation reaction by α-olefin can employ a process wherein an α-olefin is reacted in an aliphatic or aromatic solvent, a process wherein a liquefied α-olefin such as liquefied propylene and liquefied butene-1 is reacted in a non-solvent system, a process wherein ethylene, propylene, etc., are reacted in a gas phase, and the like. The reaction may also be conducted in the presence of an α-olefin polymer as previously prepared or hydrogen. Further, an organosilicon compound may be used.

After completion of the preactivation reaction, solvent, unreacted α-olefin and unreacted organoaluminum compounds are removed by filtration, decantation, etc., and the reaction product is dried to form granules which are used for the polymerization of propylene.

In the polymerization step (I), propylene is homopolymerized in the presence of a catalyst system wherein the amount of the organosilicon compound in the above preactivated catalyst is adjusted so that a molar ratio of the organoaluminum compound to the organosilicon compound is 1–15.

Any process may be employed for the polymerization of propylene, including a slurry polymerization carried out in a hydrocarbon solvent such as n-hexane, n-heptane, n-octane, benzene and toluene, a bulk polymerization carried out in a liquefied propylene and a gas phase polymerization.

The conditions for slurry polymerization usually include a polymerization temperature of 20–90° C., preferably 50–80° C. and a polymerization pressure of 0–5 MPa, and those for gas phase polymerization usually include a polymerization temperature of 20–150° C. and a polymerization pressure of 0.2–5 MPa. In either case, hydrogen is usually used for controlling the molecular weight.

In the polymerization step (II) using one or two polymerization vessels connected in series, subsequent to the polymerization step (I), ethylene and propylene are copolymerized usually under the conditions of a polymerization temperature of 20–80° C., preferably 40–70° C. and a polymerization pressure of 0–5 MPa in the presence of the polypropylene produced in the polymerization step (I) and the catalyst system used therefor, thus producing the ethylene-propylene copolymer component with an ethylene content of 30–80% by weight, preferably 40–70% by weight, in an amount equivalent to 5–40% by weight of the polypropylene/ethylene-propylene copolymer composition (a).

In the polymerization step (II) also, hydrogen is used for controlling the molecular weight and a hydrogen concentration in a gas phase is usually controlled to 0.1–10 mol %.

The above-mentioned processes can produce the polypropylene/ethylene-propylene copolymer composition (a) having the aimed characteristics as mentioned above.

(b) Ethylene/α-olefin copolymer rubber

The ethylene/α-olefin copolymer rubber (b) has an ethylene content of 25–90% by weight and comprises a copolymer rubber wherein ethylene and an α-olefin of 4 or more carbon atoms are copolymerized, and it serves as a component for imparting the elasticity, especially elongation to the resin composition. The copolymer rubber also exhibits a long period in the range of 6–14 nm, preferably 8–12 nm as determined for the sheet by a small-angle X-ray scattering under the conditions: a radiation source of Cu-Kα ray; a step angle of 0.02°; and a scanning range of −4° to +4°, using a X-ray diffractometer (JEOL 8200T) manufactured by Japan Electron Co., Ltd. The ethylene component therein is present as a polyethylene crystal.

The long period of the ethylene/α-olefin copolymer rubber (b) expresses the crystallizability of polyethylene in the copolymer rubber. The polyethylene crystal in the copolymer rubber acts as a pseudo-crosslinked substance to enhance the rubber. If the long period is too low, i.e., the polyethylene crystal is too small or the crystallizability is insufficient, the action as a pseudo-crosslinked substance becomes insufficient. If the long period is too high, i.e., the polyethylene crystal is too large, the copolymer rubber is easy to separate from the polyolefin resin composition, which is responsible for reduction in tensile elongation of the article molded from the resin composition comprising such copolymer rubber.

The ethylene/α-olefin copolymer rubbers are not limited in respect of the molecular weight, but it is preferable to use those having a melt index (MI) (according to ASTM D 1238) of 0.1–30 g/10 min. The ethylene content in the ethylene/α-olefin copolymer rubber is preferably 25–90% by weight, and more preferably 45–90% by weight.

The ethylene/α-olefin copolymer rubber is, for example, a random copolymer rubber constituted by two or three components which comprises ethylene and one or more α-olefins of 4 or more carbons, or a mixture of the random copolymers. Preferred are a copolymer rubber constituted by two components such as ethylene/1-butene copolymer rubber, ethylene/1-hexene copolymer rubber and ethylene/1-octene copolymer rubber, a copolymer rubber constituted by three components such as ethylene/1-butene/1-hexene copolymer rubber, and the mixtures thereof.

In the present polyolefin resin composition, the amount of the ethylene/α-olefin copolymer rubber incorporated is 5–40% by weight, preferably 10–30% by weight, on the basis of the resin composition.

The ethylene/α-olefin copolymer rubber has an effect on the impact resistance of the molded article. If the amount is too little, the effect of improving the impact resistance is unsatisfactory. If it is too much, the rigidity and the high-temperature rigidity lower, and also, the flowability of the resin composition may be impaired.

The ethylene/α-olefin copolymer rubber can be produced, for example, by a polymerization process as disclosed in JP-A-6-306121 wherein ethylene is continuously brought into contact with one or more substantially linear olefin polymers or α-olefins of 2–20 carbons under the polymerization condition in the presence of a catalyst composition comprising a 3–10 Group metal in the Periodic Table or a lanthanide metal, a metal coordination complex and an activation co-catalyst.

(c) Hydrogenated diene block copolymer

The hydrogenated diene block copolymer is a diene block copolymer wherein not less than 85%, preferably 90% or more, of the unsaturated bonds are hydrogenated. This diene block copolymer is A-B or A-B-A block copolymer wherein the A segment is a 1,4-polybutadiene block and the B segment is a 1,2-polybutadiene block, a polyisoprene block or a butadiene/isoprene copolymer block. The hydrogenated 1,4-polybutadiene block (A) has a maximum melting temperature peak in the range of 80–120° C. as determined by a differential scanning calorimeter.

The hydrogenated diene block copolymer (c) acts as a compatibilizing agent for enhancing the compatibility between the polypropylene/ethylene-propylene copolymer composition (a) and the ethylene/α-olefin copolymer rubber (b), to micro-disperse the copolymer rubber particles (b) in the copolymer composition (a), thus improving the impact resistance of the molded article.

The melting temperature of the hydrogenated 1,4-polybutadiene block (A) in the hydrogenated diene block copolymer (c) is an index of the crystallizability. If the melting temperature is too low, i.e., the crystallizability is low, the compatibility with the ethylene/α-olefin copolymer rubber (b) becomes unsatisfactory.

The hydrogenated 1,2-polybutadiene and/or polyisoprene block (B) has a compatibility with the copolymer composition (a).

The hydrogenated diene block copolymers can include, for example, a hydrogenated product of a diblock copolymer comprising 1,4-polybutadiene and 1,2-polybutadiene, etc., as disclosed in JP-B-62-45883; a hydrogenated product of a diblock or triblock copolymer comprising 1,4-polybutadiene and 1,2-polybutadiene or 1,4-polybutadiene and polyisoprene, etc., as disclosed in JP-A-4-342752; a hydrogenated product of an isoprene/butadiene copolymer, etc., as disclosed in JP-A-1-168743; and a hydrogenated product of an isoprene-butadiene//isoprene block copolymer, a hydrogenated product of a butadiene-isoprene//butadiene block copolymer and a hydrogenated product of an isoprene-butadiene block copolymer, etc., as disclosed in JP-A-1-168744.

It is more preferable as a compatibilizing agent that the hydrogenated diene block copolymer (c) is linear.

The amount of the hydrogenated diene block copolymer (c) incorporated is 1–10% by weight, preferably 2–5% by weight, on the basis of the resin composition.

If the amount of the hydrogenated diene block copolymer (c) incorporated is too little, an effect of dispersing the ethylene/α-olefin copolymer rubber (b) in the copolymer composition (a) as a compatibilizing agent becomes weak, so that a phase separation by heat on molding cannot be prevented. If it is too much, the resin composition is plasticized and softened, thereby lowering the rigidity and the high-temperature rigidity of the molded article.

(d) Talc

The talc (d) is finely divided talc particles having an average particle size of not more than 2 μm, in which the content of particles having a size of 4 μm or more is not more than 4% by weight, the size being measured by Shimadzu Laser Diffraction Particle Size Analyzer (SALD-2000) manufactured by Shimadzu Corporation, Japan. It is incorporated as a component for imparting the rigidity to the molded article. If the average particle size of the talc (d) is too large and/or the content of particles having a size of 4 μm or more is too much, the impact resistance, particularly the surface impact resistance of the final molded article lowers.

In the present polyolefin resin composition for molding, the amount of the talc incorporated is 5–30% by weight, preferably 15–25% by weight, on the basis of the resin composition.

It is important that the amount of the talc (d) incorporated is as small as possible on a required level, because talc produces adverse effects such as impairing the flowability of the resin composition, increasing the specific gravity of the molded product, consequently increasing the product weight, and producing a flow mark on the surface of the molded article.

If the amount of the talc incorporated is too little, however, the rigidity and the high-temperature rigidity of the molded article lower, thus making it difficult to maintain the flexural modulus and the heat distortion temperature required as the basic properties of interior automotive trim parts. If it is too much, the tensile elongation at break and the impact resistance of the molded article tend to lower and a flow mark is easy to appear on the surface of the molded article.

(e) Other components

If desired, various additives can be incorporated into the polyolefin resin composition of the present invention within the range not inhibiting the effects of the invention. These various additives include antioxidants, antistatic agents, colorants (pigments), nucleating agents, slip agents, release agents, flame retardants, ultraviolet absorbers, weathering agents, plasticizers and free-radical generators.

The polyolefin resin composition of the present invention contains the components (a) to (c) in the respective prescribed amounts, and further may contain talc and the additive (e), if desired.

The resin composition of the invention can be produced, for example, by a method wherein the predetermined amounts of the components (a) to (d) are stirred and mixed with a stabilizer and a colorant as an additive of the component (e) using a ribbon blender, tumbling mixer, Henschel mixer (trade name), supermixer or the like, and the resulting mixture is melt-kneaded at a melt temperature of 150–300° C., preferably 180–250° C. using a roll mill, Banbury mixer, LaboPlastomill, single- or twin-screw extruder or the like and then pelletized.

The resulting resin composition can be subjected to the production of various moldings by any of various molding methods including injection molding, injection press molding, extrusion molding, vacuum forming and pressure forming. Of these molding methods, injection molding and injection press molding are preferably used for producing moldings from the composition.

The interior automotive trim parts of the present invention are the articles molded into the desired shape from the polyolefin resin composition wherein the melt flow rate is controlled to not less than 20 g/10 min (MFR: according to ASTM D 1238). These molded articles satisfy the basic performance required for the interior automotive trim parts such as flexural modulus of 2200 MPa or more at room temperature (according to ASTM D 790), heat distortion temperature of 70° C. or higher (1820 kPa load, according to ASTM D 648) and Izod impact strength of 300 J/m or more at room temperature (according to ASTM D 256).

EXAMPLE

The invention is further illustrated by the following Examples and Comparative Examples.

1) Components of resin composition

The physical properties of each component used in Examples and Comparative Examples are shown below.

(a) Polypropylene/ethylene-propylene copolymer composition

|  | Component No. | |
| --- | --- | --- |
|  | a-1 | a-2 |
| Polypropylene component | | |
| Isotactic pentad ratio | 0.996 | 0.955 |
| Q value | 5.0 | 5.7 |
| MFR$_{PP}$ (g/10 min) | 36 | 35 |
| Log (MFR$_{max}$/MFR$_{min}$) | 0.18 | 0.24 |
| Proportion (% by weight) | 86 | 87 |
| Ethylene-propylene copolymer component | | |
| MFR$_{EP}$ (g/10 min) | | |
| Ethylene content (% by weight) | 50 | 59 |
| Proportion (% by weight) | 14 | 13 |
| Polypropylene/ethylene-propylene copolymer composition | | |
| MFR$_a$ (g/10 min) | 23 | 23 |
| Log (MFR$_{PP}$/MFR$_{EP}$) | 4.1 | 2.4 |

(b) Ethylene/α-olefin copolymer rubber

| Component No. | α-olefin | Ethylene content (% by weight) | MI (g/10 min) | Long period (nm) |
| --- | --- | --- | --- | --- |
| b-1 | 1-Octene | 76.3 | 1.1 | 8.6 |
| b-2 | 1-Octene | 76.2 | 4.3 | 9.2 |
| b-3 | 1-Octene | 77.9 | 2.9 | 9.3 |
| b-4 | 1-Butene | 90 | 2.1 | 11.2 |
| b-5 | 1-Butene | 80 | 3.0 | 10.2 |
| b-6 | 1-Butene | 85 | 3.6 | 10.9 |
| b-7 | 1-Hexene | 85 | 1.3 | 11.0 |
| b-8 | 1-Hexene/1-butene Hexene content | 85 (14% by weight) | 3.5 | 10.8 |
| b-9 | Propylene Mooney viscosity ML1 + 4 (100° C.) = 60 | 78 | 0.4 | 15.6 |

(c) Hydrogenated diene block copolymer

|  | Component No. | | |
| --- | --- | --- | --- |
|  | c-1 | c-2 | c-3 |
| Structure | A-B-A type | A-B-A type | A-B type |
| A segment | 1,4-PB | 1,4-PB | 1,4-PB |
| Proportion (% by weight) | 30 | 30 | 30 |
| Melting temperature (° C.) | 97 | 92 | 92 |
| B segment | 1,2-PB/1,4-PB | 1,2-PB/1,4-PB | 1,4-PB/PI |
| Proportion (% by weight) | 70 | 70 | 70 |
| Hydrogenation (%) | 95 | 95 | 95 |
| MFR (g/10 min) | 1.4 | 0.4 | 14 |

1,4-PB: 1,4-Polybutadiene
1,2-PB: 1,2-Polybutadiene
PI: Polyisoprene
MFR: 230° C., 2.16 kg load (d) Talc

| d-1) Finely divided talc particles | |
| --- | --- |
| Average particle size | 1.3 μm |
| Content of particles having a size of 4 μm or more | 2.5% by weight |

2) Method for the measurement of physical properties
The physical properties of each above component were measured by the following methods.
(a) Isotactic pentad ratio (P)
The isotactic ratio of the pentad unit was measured by $^{13}$C-NMR according to Macromolecules 8, 687 (1975).
(b) Average molecular weight ($M_n$, $M_w$) and Q value
The number average molecular weight ($M_n$) and weight average molecular weight ($M_w$) were measured by gel permeation chromatography (GPC: 150 type, manufactured by Waters Co., Ltd., the column used: TSK GEL GMH6-HT) using the sample wherein the polymer is dissolved in orthodichlorobenzene at 135° C. The Q value was calculated from the resultant $M_n$ and $M_w$.
(c) Ethylene content
The ethylene content was determined by an infrared absorption spectrum method.

The standard samples were prepared by varying the weight ratio of the propylene homopolymer to the ethylene-propylene copolymer ($W_{PP}/W_{EP}$) and the reaction ratio of ethylene/propylene, and a calibration curve was made from the infrared absorption spectrum of the standard sample.

From the infrared absorption spectrum of the polypropylene/ethylene-propylene copolymer composition synthesized based on the calibration curve, a production ratio of the ethylene-propylene copolymer component in the copolymerization of ethylene and propylene and a total ethylene content in the polypropylene/ethylene-propylene copolymer composition were obtained, and an ethylene content in the ethylene-propylene copolymer component was calculated.

(d) Long period of ethylene/α-olefin copolymer rubber

The pellets of the ethylene/α-olefin copolymer rubber were melt at 230° C. under 10 MPa for 5 minutes and cooled to 50° C. under 10 MPa to prepare a sheet having a thickness of 500 μm. The long period of the sheet was measured by a small-angle X-ray scattering using a X-ray diffractometer (JEOL 8200 T) manufactured by JEOL under the following conditions: radiation ray: Cu-Kα ray; step angle: 0.02°; scanning range: −4° to +4°.

(e) Melting temperature of A segment in the hydrogenated diene block copolymer.

10 mg of a sample was introduced into a differential scanning calorimeter (1090 type DSC) manufactured by E. I. du Pont de Nemours & Co. First, the sample was heated to 230° C. at a rising rate of 30° C./min and kept at 230° C. for 10 minutes. Then, the sample was cooled to −60° C. at a decreasing rate of 20° C./min and kept at −60° C. for 10 minutes. The melting temperature was read from a peak of a thermogram obtained when the temperature of the sample was again elevated at a rising rate of 20° C./min.

(f) Melt Flow Rate of each component (MFR)

The pellets of the component to be measured were determined under the conditions of 230° C. and a load of 2.16 kg according to ASTM D 1238.

(g) Melt Index (MI) of ethylene/α-olefin copolymer rubber

The pellets of the ethylene/α-olefin copolymer rubber were determined under the conditions of 190° C. and a load of 2.16 kg according to ASTM D 1238.

3) Preparation of Resin Composition

Examples 1–10 and Comparative Examples 1–8

Each of the above-mentioned components was mixed in the respective proportions shown in Tables 1 and 2. The mixture was incorporated with a phenolic antioxidant as a stabilizer: 0.05 part by weight of tetrakis[methylene-3-(3,5-di-tert.butyl-4-hydroxyphenyl)propionate]methane, a phosphorus antioxidant: 0.05 part by weight of tetrakis(2,4-di-tert.butyl phenyl)-4,4-biphenylene-diphosphonite, a neutralizer: 0.1 part by weight of calcium stearate and a dispersant: 0.2 part by weight of zinc stearate. The resulting mixture was stirred and mixed by a Henschel mixer (trade name) for 3 minutes, melt-kneaded at 200° C. by a twin-screw extruder (PCM-45) manufactured by Ikegai Corporation, Japan and pelletized to prepare the resin compositions of Examples 1–10 and Comparative Examples 1–8.

TABLE 1

| | Example No. | | | | | | | | | |
|---|---|---|---|---|---|---|---|---|---|---|
| | 1 | 2 | 3 | 4 | 5 | 6 | 7 | 8 | 9 | 10 |
| Composition | | | | | | | | | | |
| (a) Polypropylene/ethylene-propylene copolymer composition | | | | | | | | | | |
| Component No. | a-1 | a-1 | a-1 | a-1 | a-1 | a-1 | a-1 | a-1 | a-1 | a-1 |
| Proportion (wt %) | 64 | 62 | 65 | 60 | 61 | 60 | 60 | 60 | 62 | 65 |
| (b) Ethylene/α-olefin copolymer rubber | | | | | | | | | | |
| Component No. | b-1 | b-1 | b-3 | b-4 | b-5 | b-6 | b-8 | b-4 | b-1 | b-3 |
| Proportion (wt %) | 13 | 6.5 | 12 | 17 | 7.5 | 17 | 17 | 17 | 6.5 | 12 |
| Component No. | | b-2 | | | b-7 | | | | b-2 | |
| Proportion (wt %) | | 6.5 | | | 7.5 | | | | 6.5 | |
| (c) Hydrogenated diene block copolymer | | | | | | | | | | |
| Component No. | c-1 | c-1 | c-1 | c-1 | c-1 | c-1 | c-1 | c-2 | c-3 | c-3 |
| Proportion (wt %) | 3 | 5 | 3 | 3 | 4 | 3 | 3 | 3 | 5 | 3 |
| (d) Finely divided talc particles | | | | | | | | | | |
| Proportion (wt %) | 20 | 20 | 20 | 20 | 20 | 20 | 20 | 20 | 20 | 20 |
| Physical Properties | | | | | | | | | | |
| (1) Melt flow rate (g/10 min) | 21 | 22 | 25 | 21 | 21 | 24 | 24 | 20 | 25 | 27 |
| (2) Flexural modulus (MPa) | 2310 | 2380 | 2330 | 2300 | 2280 | 2260 | 2270 | 2300 | 2270 | 2275 |
| (3) Heat distortion temperature (° C.) | 72 | 71 | 74 | 74 | 72 | 73 | 73 | 75 | 71 | 71 |
| (4) Tensile elongation at break (%) | >400 | >400 | >400 | >400 | >400 | >400 | >400 | >400 | >400 | >400 |
| (5) Izod impact strength (J/m) | 310 | 320 | 420 | 480 | 320 | 390 | 400 | 400 | 310 | 400 |

TABLE 2

|  | Comparative Example No. | | | | | | | |
| --- | --- | --- | --- | --- | --- | --- | --- | --- |
|  | 1 | 2 | 3 | 4 | 5 | 6 | 7 | 8 |
| Composition | | | | | | | | |
| (a) Polypropylene/ethylene-propylene copolymer composition | | | | | | | | |
| Component No. | a-1 | a-1 | a-1 | a-1 | a-1 | a-1 | a-2 | a-1 |
| Proportion (wt %) | 64 | 62 | 65 | 62 | 62 | 44 | 65 | 63 |
| (b) Ethylene/α-olefin copolymer rubber | | | | | | | | |
| Component No. | b-1 | b-1 | b-3 | | | b-2 | b-2 | |
| Proportion (wt %) | 16 | 9 | 15 | | | 18 | 12 | |
| Component No. | | b-2 | | | | | | |
| Proportion (wt %) | | 9 | | | | | | |
| (c) Hydrogenated diene block copolymer | | | | | | | | |
| Component No. | | | | c-1 | c-3 | c-1 | c-1 | c-1 |
| Proportion (wt %) | | | | 18 | 18 | 3 | 3 | 3 |
| (d) Finely divided talc particles | | | | | | | | |
| Proportion (wt %) | 20 | 20 | 20 | 20 | 20 | 35 | 20 | 20 |
| Physical Properties | | | | | | | | |
| (1) Melt flow rate (g/10 min) | 21 | 22 | 26 | 17 | 29 | 21 | 25 | 17 |
| (2) Flexural modulus (MPa) | 2320 | 2300 | 2360 | 1500 | 1400 | 3100 | 2800 | 2200 |
| (3) Heat distortion temperature (° C.) | 72 | 71 | 74 | 56 | 55 | 73 | 80 | 71 |
| (4) Tensile elongation at break (%) | 160 | 150 | 180 | >400 | >400 | 30 | 100 | 80 |
| (5) Izod impact strenqth (J/m) | 130 | 120 | 170 | 580 | 600 | 40 | 150 | 180 |

4) Molding of Resin Composition

The pellets of each resin composition obtained in the above Examples and Comparative Examples were determined for MFR according to the method as mentioned above. From these pellets, test pieces for the following evaluation test were molded by injection molding at a molding temperature of 210° C. and a mold temperature of 40° C., and then subjected to the evaluation tests. The results are shown in Tables 1 and 2.

5) Evaluation Test (a) Flexural Modulus (three-point flexural modulus) (MPa)

Test pieces having a length of 130 mm, a width of 13 mm and a thickness of 6.4 mm were used and measured for flexural modulus under the condition of 23° C. according to ASTM D 790 to evaluate the rigidity.

(b) Heat Distortion Temperature (° C.)

Test pieces having a length of 130 mm, a width of 13 mm and a thickness of 6.4 mm were used and measured for heat distortion temperature under the condition of 1820 kPa load according to ASTM D 648 to evaluate the high-temperature rigidity.

(c) Tensile Tests (MPa, %)

Test pieces having a length of 246 mm, a width of 19 mm and a thickness of 3.2 mm were used and measured for tensile strength at yield point and tensile elongation at break under the condition of 23° C. according to ASTM D 638.

(d) Izod Impact Strength (J/m)

Test pieces having a length of 63.5 mm, a width of 12.7 mm and a thickness of 6.4 mm were notched and measured for Izod impact strength at 23° C. according to ASTM D 256 to evaluate the impact resistance.

6) Evaluation Results

As apparent from Examples 1 to 8 shown in Table 1, the resin compositions of the present invention have excellent flowability, and the articles molded from such resin compositions have excellent rigidity and impact resistance. These properties include MFR of 20 g/10 min or more for the resin compositions, and flexural modulus of 2200 MPa or more at room temperature, heat distortion temperature of 70° C. or higher and Izot impact strength of 300 J/m or more at room temperature for the molded articles, satisfying the basic characteristics required for interior automotive trim parts.

In contrast, the resin compositions of Comparative Examples 1 to 3 not containing the hydrogenated diene block copolymer have a poor balance of rigidity and impact resistance, especially poor impact resistance, and also have a reduced tensile elongation at break. The resin compositions of Comparative Examples 4 and 5 containing more than 10% by weight of the hydrogenated diene block copolymer exhibit an improved impact resistance, but remarkably low rigidity and high-temperature rigidity.

The resin composition of Comparative Example 6 containing more than 30% by weight of talc demonstrates lowered flowability and tensile elongation at break due to an addition of talc in a large quantity.

The resin composition of Comparative Example 7 wherein conventional propylene/ethylene block copolymer (a-2) was substituted for the polypropylene/ethylene-propylene copolymer composition (a-1) exhibits a remarkably low toughness in terms of impact resistance and tensile elongation at break.

The resin composition of Comparative Example 8 using the ethylene/α-olefin copolymer rubber having the long period of 14 nm or more exhibits a remarkably low impact resistance and tensile elongation at break.

Effect of the Invention

The polypropylene resin compositions of the present invention exhibit excellent flowability by incorporating a specific amount of talc into a resin component comprising a specific high rigid polypropylene/ethylene-propylene copolymer composition, a specific ethylene/α-olefin copolymer rubber and a specific hydrogenated diene block copolymer, and also the articles molded therefrom are superior in high-temperature rigidity and impact resistance to those molded from conventional polypropylene resin compositions. Accordingly, the use of the present resin compositions for a molding material can make interior automotive trim parts large-sized, thin-walled, light in weight and low-cost.

What is claimed is:

1. A polyolefin resin composition comprising
    (a) 50–94% by weight of a polypropylene/ethylene-propylene copolymer composition,
    (b) 5–40% by weight of an ethylene/α-olefin copolymer rubber and
    (c) 1–10% by weight of a hydrogenated diene block copolymer, the sum of components (a), (b) and (c) being 100% by weight,
    wherein the polypropylene/ethylene-propylene copolymer composition (a) comprises 60–95% by weight of a polypropylene component and 5–40% by weight of an ethylene-propylene copolymer component having an ethylene content of 30–80% by weight, the polypropylene component has an isotactic pentad ratio (P) of not less than 0.96 and a $M_w/M_n$ (Q value) of not more than 6, and a ratio of the maximum melt flow rate ($MFR_{max}$) to the minimum melt flow rate ($MFR_{min}$) has the following relationship $$0.1 \leq \log(MFR_{max}/MFR_{min}) \leq 1$$

and further the polypropylene/ethylene-propylene copolymer composition (a) has the following relationship between the melt flow rate of the polypropylene component ($MFR_{PP}$) and the melt flow rate of the ethylene-propylene copolymer component ($MFR_{EP}$)

$$3 \leq \log(MFR_{PP}/MFR_{EP}) \leq 7$$

the ethylene/α-olefin copolymer rubber (b) is a copolymer of ethylene and an α-olefin of 4 or more carbons, has an ethylene content of 25–90% by weight and contains a polyethylene crystal having a long period of 6–14 nm as determined by a small angle X-ray scattering, and
    the hydrogenated diene block copolymer (c) is A-B or A-B-A block copolymer wherein A segment is a 1,4-polybutadiene block and B segment is a 1,2-polybutadiene block, a polyisoprene block or a butadiene/isoprene copolymer block, not less than 85% of unsaturated bonds therein being hydrogenagted.

2. The polyolefin resin composition of claim 1 wherein the ethylene/α-olefin copolymer rubber has a long period of 8–12 nm as determined by a small angle X-ray scattering.

3. The polyolefin resin composition of claim 1 wherein the ethylene/α-olefin copolymer rubber is a random copolymer rubber constituted by two or three components of ethylene and an α-olefin of 4 or more carbons, or a mixture thereof.

4. The polyolefin resin composition of claim 3 wherein the random copolymer rubber constituted by two components is selected from the group consisting of an ethylene/1-butene copolymer rubber, an ethylene/1-hexene copolymer rubber and an ethylene/1-octene copolymer rubber and the random copolymer rubber constituted by three components is an ethylene/1-butene/1-hexene copolymer rubber.

5. The polyolefin resin composition of claim 1 wherein the hydrogenated diene block copolymer is a diene block copolymer in which the B segment is a copolymer of 1,2-polybutadiene and 1,4-polybutadiene and/or a copolymer of polybutadiene and isoprene and in which not less than 85% of unsaturated bonds are hydrogenated.

6. The polyolefin resin composition of claim 1 further comprising 5–30% by weight of talc based on the total weight of the resin composition.

7. The polyolefin resin composition of claim 6 wherein talc is finely divided talc particles having an average particle size of not more than 2 μm, the content of the particles of not less than 4 μm being not more than 4% by weight.

8. The polyolefin resin composition of claim 1 further comprising a desired additive.

9. The polyolefin resin composition of claim 8 wherein the additives are antioxidants, antistatic agents, colorants, nucleating agents, slip agents, release agents, flame retardants, ultraviolet absorbers, weathering agents, plasticizers and free-radical generators.

10. An interior automotive trim part which is molded from the polyolefin resin composition of claim 6 having a melt flow rate (MFR) of not less than 20 g/10 min and which has a flexural modulus of not less than 2200 MPa at 23° C., a heat distortion temperature of not lower than 70° C. and an Izod impact strength of not less than 300 J/m at room temperature.

* * * * *